US010010025B2

(12) United States Patent
Dienst et al.

(10) Patent No.: US 10,010,025 B2
(45) Date of Patent: Jul. 3, 2018

(54) OPENER ATTACHMENT FOR AN AGRICULTURAL ROW UNIT

(71) Applicant: CNH Industrial America LLC, New Holland, PA (US)

(72) Inventors: Johnathon R. Dienst, Dekalb, IL (US); Brian John Anderson, Yorkville, IL (US); Marvin A. Prickel, Homer Glen, IL (US)

(73) Assignee: CNH Industrial America LLC, New Holland, PA (US)

( * ) Notice: Subject to any disclaimer, the term of this patent is extended or adjusted under 35 U.S.C. 154(b) by 103 days.

(21) Appl. No.: 15/011,274

(22) Filed: Jan. 29, 2016

(65) Prior Publication Data

US 2017/0215334 A1   Aug. 3, 2017

(51) Int. Cl.
| A01C 5/06 | (2006.01) |
| A01C 7/20 | (2006.01) |
| A01C 23/02 | (2006.01) |
| A01C 7/00 | (2006.01) |

(52) U.S. Cl.
CPC .............. *A01C 7/205* (2013.01); *A01C 5/064* (2013.01); *A01C 7/006* (2013.01); *A01C 23/023* (2013.01); *A01C 7/203* (2013.01)

(58) Field of Classification Search
CPC ........... A01C 6/064; A01C 5/062; A01C 5/06; A01C 5/00; A01C 7/203; A01C 7/201; A01C 7/20; A01C 23/023; A01C 23/02; A01C 23/00; A01C 7/205; A01C 7/006; A01C 7/00
See application file for complete search history.

(56) References Cited

U.S. PATENT DOCUMENTS

| 4,574,715 | A | 3/1986 | Dietrich, Sr. et al. |
| 4,920,901 | A | 5/1990 | Pounds |
| 4,987,841 | A | 1/1991 | Rawson et al. |
| 6,347,594 | B1 | 2/2002 | Wendling et al. |
| 6,389,999 | B1 | 5/2002 | Duello |
| 7,481,171 | B2 | 1/2009 | Martin |
| 7,540,246 | B2 | 6/2009 | Friesen et al. |
| 8,386,137 | B2 | 2/2013 | Sauder et al. |
| 8,522,889 | B2 | 9/2013 | Adams et al. |
| 8,561,472 | B2 | 10/2013 | Sauder et al. |
| 8,776,702 | B2 | 7/2014 | Bassett |

(Continued)

OTHER PUBLICATIONS

Richard McDonnell, How technology is helping farmers boost yield, Aug. 15, 2013, 4 pages. http://www.oemoffhighway.com/article/11116949/automatically-adjusting-agricultural-seeder-machine-with-pneumatics.

(Continued)

*Primary Examiner* — Christopher J. Novosad
(74) *Attorney, Agent, or Firm* — Rebecca L. Henkel; Rickard K. DeMille

(57) ABSTRACT

An opener attachment for an agricultural row unit including a frame, an arm pivotally coupled to the frame, an opener disc coupled to the arm and configured to excavate a trench into soil, and a gauge wheel coupled to the arm and configured to block movement of the opener disc into the soil to control a depth of the trench. The opener attachment also includes a mechanical stop coupled to the frame and configured to block the gauge wheel and the opener disc moving toward the soil. In addition, the opener attachment includes an air bag configured to urge the gauge wheel and the opener disc toward the soil.

20 Claims, 7 Drawing Sheets

(56) References Cited

U.S. PATENT DOCUMENTS

| | | | |
|---|---|---|---|
| 8,826,836 | B2 | 9/2014 | Van Buskirk et al. |
| 8,839,726 | B2 | 9/2014 | Van Buskirk et al. |
| 9,078,392 | B2 | 7/2015 | Van Buskirk et al. |
| 9,148,989 | B2 | 10/2015 | Van Buskirk et al. |
| 2009/0056962 | A1 | 3/2009 | Martin et al. |
| 2011/0048297 | A1 | 3/2011 | Tobin |
| 2012/0234218 | A1 | 9/2012 | Martin |
| 2014/0166321 | A1 | 6/2014 | Hurd |
| 2014/0214284 | A1 | 7/2014 | Sauder et al. |
| 2014/0290545 | A1 | 10/2014 | Van Buskirk et al. |

OTHER PUBLICATIONS

PAS (Premium Ag Solutions), 20/20 Airforce, Dec. 30, 2015, 4 pages. http://www.premiumagsolutions.com/precision-planting/monitor-system/2020-airforce/.

Tom Bechman, Air bags are a big step forward on planters vs. springs. Dec. 30, 2015, 3 pages. http://farmprogress.com/story-air-bags-are-big-step-forward-planters-vs-springs-9-125508.

Yetter Manufacturing Inc., Air adjust products, a tradition of solutions blog, Dec. 30, 2015, 2 pages, http://www.yetterco.com/products?catId=388&productId=208.

D.K. Farms Inc., John Deere—Planter Row Unit Airbag, 4 pages, http://dkfarms.com/products-view/john-deere-planter-row-unit-airbag/.

Yetter Manufacturing Inc., Row Cleaners, 2 pages, Jan. 29, 2016, http://www.yetterco.com/products?catId=131&productId=208.

Yetter Manufacturing Inc., 4000 Nutrient Pro, 2 pages, Jan. 29, 2016, http://www.yetterco.com/products?catId=133&productId=268.

OPENER ATTACHMENT FOR AN AGRICULTURAL ROW UNIT

BACKGROUND

The invention relates generally to an opener attachment for an agricultural row unit.

Generally, planting implements (e.g., planters) are towed behind a tractor or other work vehicle via a mounting bracket secured to a rigid frame of the implement. Planting implements typically include multiple row units distributed across a width of the implement. Each row unit is configured to deposit seeds at a desired depth beneath the soil surface of a field, thereby establishing rows of planted seeds. For example, each row unit typically includes a ground engaging tool or opener that forms a seeding path (e.g., trench) for seed deposition into the soil. An agricultural product conveying system (e.g., seed tube) is configured to deposit seeds and/or other agricultural products (e.g., fertilizer) into the trench. The opener/agricultural product conveying system is followed by closing discs that move displaced soil back into the trench and/or a packer wheel that packs the soil on top of the deposited seeds.

In certain row units, a second opener assembly may be rigidly mounted to a frame of the row unit to deposit another agricultural product (e.g., fertilizer) into the soil. Such opener assemblies may be generally referred to as fertilizer applicators. The fertilizer applicator typically includes a ground engaging tool or tools, such as an opener disc that forms a trench for fertilizer deposition into the soil. In addition, the fertilizer applicator may include one or more residue management wheels configured to prepare the soil for deposition of the agricultural product(s). When the opener disc of the fertilizer applicator encounters objects in the field, such as rocks, the entire row unit may be driven upwardly. The upward movement of the row unit may reduce the penetration depth of the opener disc, thereby degrading the performance of the row unit. For example, seed placement may offset by the upward movement, both in depth and in product spacing (e.g., in configurations in which the row unit is depositing seeds into the soil), which may negatively impact the seed yield potential.

BRIEF DESCRIPTION

In one embodiment, an opener attachment for an agricultural row unit includes a frame, a first arm pivotally coupled to the frame, an opener disc coupled to the first arm and configured to excavate a trench into soil, and a gauge wheel coupled to the first arm and configured to block movement of the opener disc into the soil to control a depth of the trench. The opener attachment also includes a second arm pivotally coupled to the frame and non-pivotally coupled to the first arm such that rotation of the second arm drives the first arm to rotate. The opener attachment further includes a mechanical stop coupled to the frame, wherein the mechanical stop is configured to block rotation of the first and second arms relative to the frame in a first rotational direction, and wherein rotation of the first arm in the first rotational direction moves the gauge wheel and the opener disc toward the soil. In addition, the opener attachment includes a biasing member coupled to the frame and to a second arm, wherein the biasing member is configured to drive the second arm in the first rotational direction.

In another embodiment, an opener attachment for an agricultural row unit includes a frame, a first arm pivotally coupled to the frame, an opener disc coupled to the first arm and configured to excavate a trench into soil, and a gauge wheel coupled to the first arm and configured to block movement of the opener disc into the soil to control a depth of the trench. The opener attachment also includes a mechanical stop coupled to the frame, wherein the mechanical stop is configured to block rotation of the first arm relative to the frame in a first rotational direction, and wherein rotation of the first arm in the first rotational direction moves the gauge wheel and the opener disc toward the soil. The opener attachment further includes an actuator system configured to drive the first arm in the first rotational direction and in a second rotational direction, opposite the first rotational direction, wherein rotation of the first arm in the second rotational direction lifts the gauge wheel and the opener disc away from the soil.

In a further embodiment, an opener attachment for an agricultural row unit includes a frame, an arm pivotally coupled to the frame, an opener disc coupled to the arm and configured to excavate a trench into soil, and a gauge wheel coupled to the arm and configured to block movement of the opener disc into the soil to control a depth of the trench. The opener attachment also includes a mechanical stop coupled to the frame, wherein the mechanical stop is configured to block rotation of the arm relative to the frame in a first rotational direction, and wherein rotation of the arm in the first rotational direction moves the gauge wheel and the opener disc toward the soil. The opener attachment further includes an air bag configured to urge the arm in the first rotational direction.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
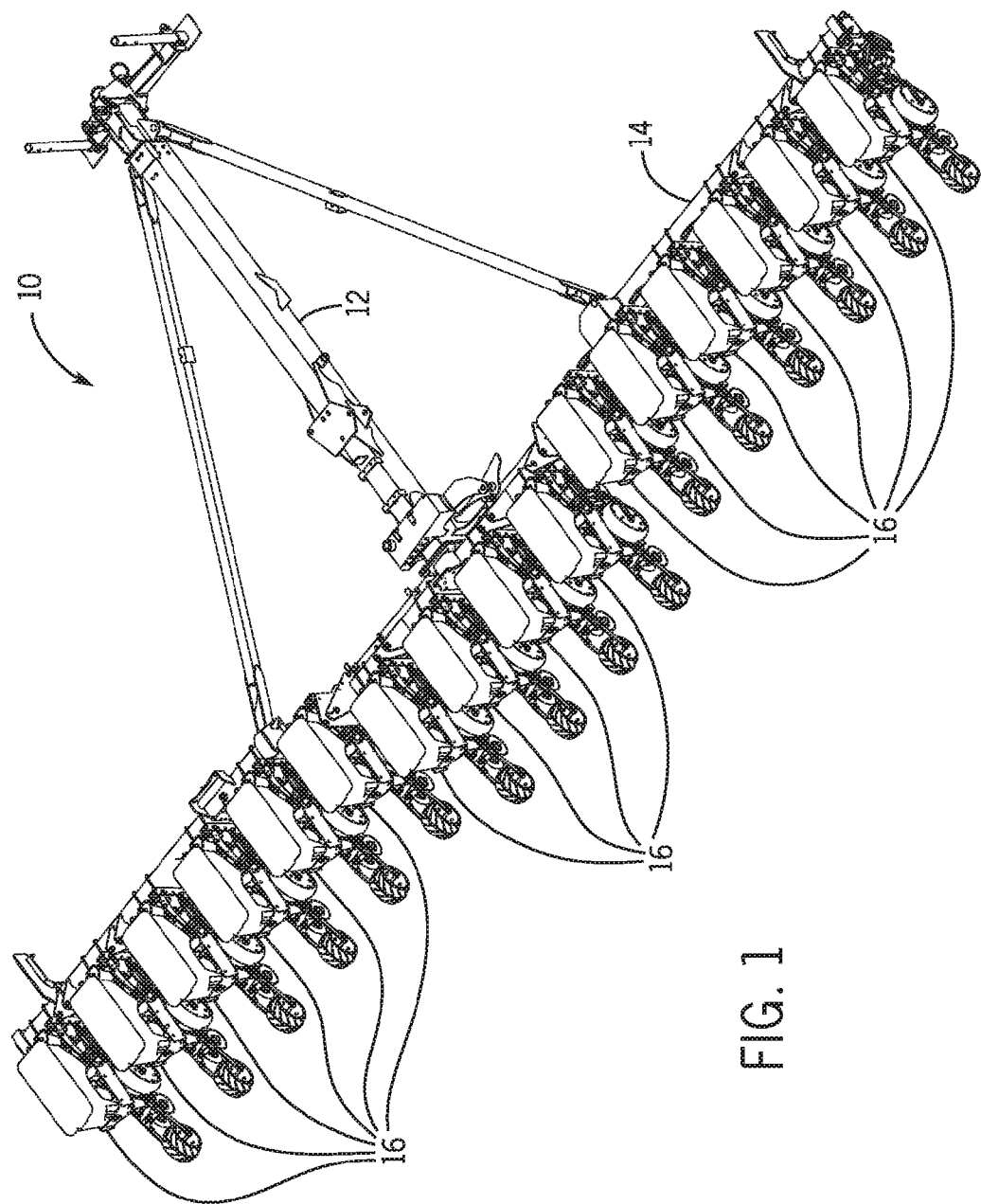
FIG. 1 is a perspective view of an embodiment of an agricultural implement.

Turning now to the drawings, FIG. 1 is a perspective view of an embodiment of an agricultural implement 10. The implement 10 is configured to be towed through a field behind a work vehicle, such as a tractor. The implement 10 includes a tongue assembly 12, which includes a hitch configured to couple the implement 10 to an appropriate tractor hitch (e.g., via a ball, clevis, or other coupling). The tongue assembly 12 is coupled to a tool bar 14 which supports multiple row units 16. As discussed in detail below, at least one row unit 16 may include an opener attachment configured to substantially isolate loading/movement of components of the opener attachment from a frame of the respective row unit 16. For example, in certain embodiments, the opener attachment includes a frame, an arm pivotally coupled to the frame, an opener disc coupled to the arm and configured to excavate a trench into the soil, and a gauge wheel coupled to the arm and configured to block movement of the opener disc into the soil to control the depth of the trench. The opener attachment further includes a mechanical stop coupled to the frame and configured to block rotation of the arm relative to the frame in a first rotational direction corresponding to movement of the gauge wheel and the opener disc toward the soil. In addition, the opener attachment includes an air bag configured to urge the arm in the first rotational direction, and the air bag is also configured to isolate loading/movement of the opener disc and the gauge wheel from a frame of the respective row unit. As such, the opener attachment may significantly improve the performance of the row unit as well as increase the precision of the seed planting, which in turn may increase seed yield. As used herein, "isolate" and "isolation" may refer to reducing the transfer of movement and/or energy from one component to another. The isolation may be partial (i.e., the transfer of movement and/or energy may be reduced) or substantially complete (i.e., the transfer of movement and/or energy may be substantially eliminated).

Figure 2:
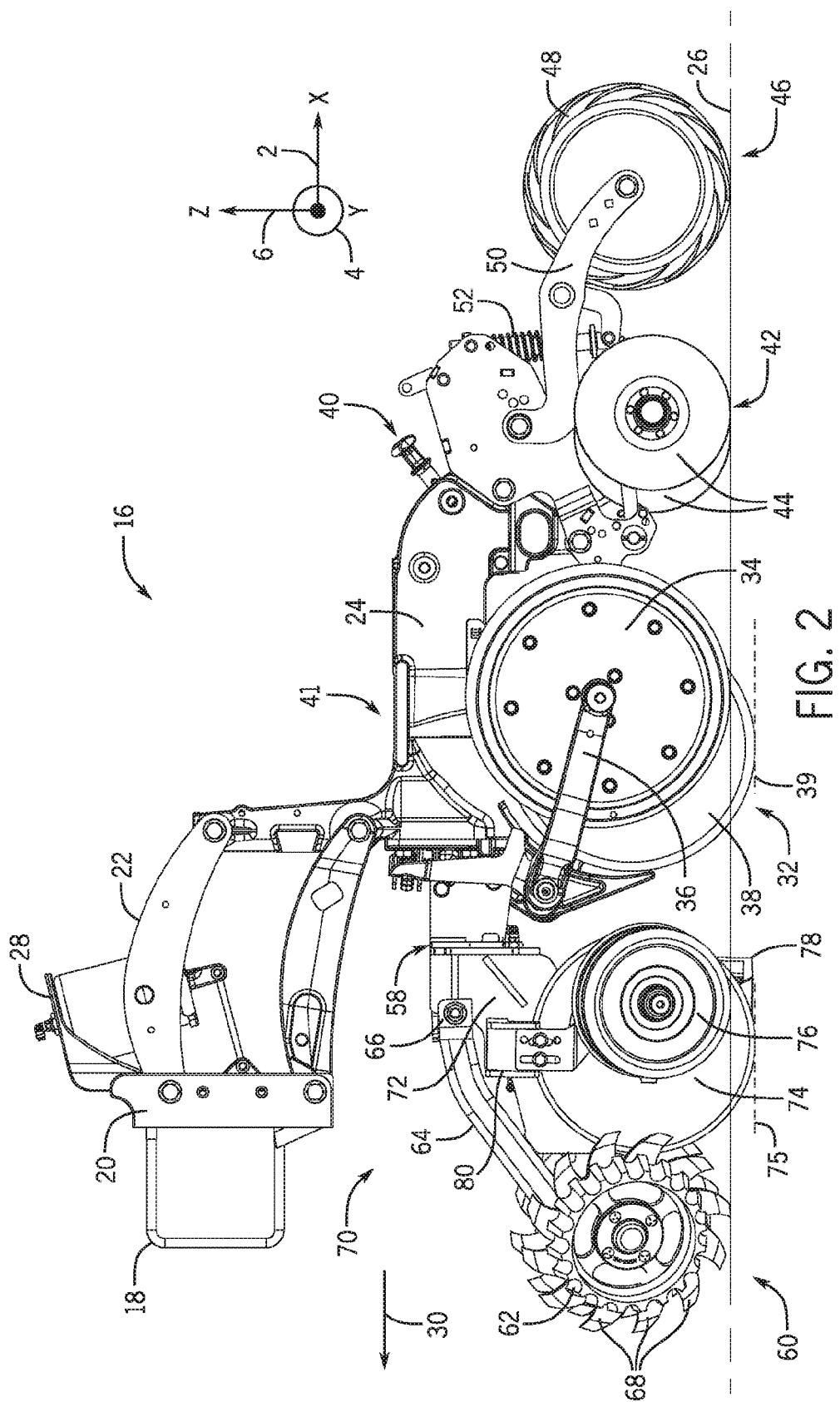
FIG. 2 is a side view of an embodiment of a row unit that may be employed within the agricultural implement in FIG. 1, in which the row unit includes an opener attachment.

FIG. 2 is a side view of an embodiment of a row unit 16 that may be employed on the agricultural implement 10 of FIG. 1. As shown, the row unit 16 may be described with reference to a longitudinal axis or x-direction 2, a vertical axis or z-direction 4, and a lateral axis or y-direction 6. In the illustrated embodiment, the row unit 16 is configured to travel in a direction that is opposite to the x direction 2. The row unit 16 includes a mount 18 configured to secure the row unit 16 to the tool bar of the agricultural implement. In the illustrated embodiment, the mount 18 includes a U-bolt that secures a bracket 20 of the row unit 16 to the tool bar. However, it should be appreciated that in alternative embodiments, the mount 18 may include another suitable device that couples the row unit 16 to the tool bar 14. A linkage assembly 22 extends from the bracket 20 to a frame 24 of the row unit 16. The linkage assembly 22 is configured to enable vertical movement of the frame 24 relative to a soil surface 26. A down pressure system 28, including an air bag, is coupled to the linkage assembly 22 and configured to urge the frame 24 toward the soil surface 26. While the illustrated linkage assembly 22 is a parallel linkage assembly (e.g., a four-bar linkage assembly), it should be appreciated that in alternative embodiments, another suitable linkage assembly may extend between the bracket 20 and the frame 24. In addition, in certain embodiments, the down pressure system may include a hydraulic actuator, a pneumatic actuator, or any other suitable type of actuator (e.g., in addition to the air bag, or as an alternative to the air bag).

The row unit 16 is configured to deposit seeds and/or other agricultural products, such as fertilizer, at a desired depth beneath the soil surface 26 as the row unit 16 traverses a field along a direction of travel 30 (opposite to the x-direction 2). The row unit 16 includes an opener assembly 32 that forms a trench in the soil surface 26 for seed deposition into the soil. In the illustrated embodiment, the opener assembly 32 includes gauge wheels 34, arms 36 that pivotally couple the gauge wheels 34 to the frame 24, and opener discs 38. The opener discs 38 are configured to excavate a trench 39 into the soil surface 26, and the gauge wheels 34 are configured to control a penetration depth of the opener discs 38 into the soil surface 26. In the illustrated embodiment, the row unit 16 includes a depth control system 40 configured to control a position of the gauge wheels 34 by controlling the position of the arms 36 (e.g., by blocking rotation of the arms in the upward direction beyond a selected position).

The row unit 16 also includes an agricultural product conveying system 41 (e.g., seed tube, etc.) configured to deposit seeds and/or other agricultural products (e.g., fertilizer) into the trench. The opener assembly 32 and the agricultural product conveying system 41 are followed by a closing assembly 42 that moves displaced soil back into the trench. In the illustrated embodiment, the closing assembly 42 includes two closing discs 44. However, it should be appreciated that in alternative embodiments, the closing assembly 42 may include other closing devices (e.g., a single closing disc, etc.) In addition, in certain embodiments, the closing assembly 42 may be omitted. In the illustrated embodiment, the closing assembly 42 is followed by a packing assembly 46 configured to pack soil on top of the deposited seeds and/or other agricultural products. The packing assembly 46 includes a packer wheel 48, an arm 50 that pivotally couples the packer wheel 48 to the frame 24, and a biasing member 52 configured to urge the packer wheel 48 toward the soil surface 26, thereby enabling the packer wheel 48 to pack soil on top of the deposited seeds and/or other agricultural products. While the illustrated biasing member 52 includes a spring, it should be appreciated that in alternative embodiments, the biasing member 52 may include another suitable biasing device, such as a hydraulic cylinder or a pneumatic cylinder, among others.

In the illustrated embodiment, the row unit 16 also includes an opener attachment 70 having a mounting assembly 58 coupled to a frame 72 of the opener attachment 70. The mounting assembly 58 is configured to couple (e.g., removable couple) the opener attachment 70 to the frame 24 of the row unit 16 via any suitable locking or coupling mechanism (e.g., bolts, etc.). In the illustrated embodiment, the opener attachment 70 also includes a residue manager 60 configured to prepare the soil for deposition of seeds and/or other agricultural products (e.g., fertilizer). The residue manager 60 includes cleaner wheels 62 rotatably coupled to an arm 64, which in turn, is pivotally coupled to the opener attachment frame 72 at a joint 66. The arm 64 is configured to enable movement of the cleaner wheels 62 along the vertical axis 6 relative to the soil surface 26. The cleaner wheels 62 include tillage points or fingers 68 configured to break up crop residue on the soil surface 26. In addition, in certain embodiments, the residue manager 60 may be omitted.

In the illustrated embodiment, the opener attachment 70 is configured to deposit agricultural products, such as fertilizer, at a desired depth beneath the soil surface 26. For example, the opener attachment 70 is configured to form a trench in the soil surface 26 for fertilizer deposition into the soil. Furthermore, the opener attachment 70 may be configured to substantially isolate loading/movement of element of the opener attachment 70 from the row unit 16 via a suitable damping system (e.g., spring, air bag, etc.), as will be discussed in more detail below. In the illustrated embodiment, the opener attachment 70 includes an opener disc 74, a gauge wheel 76, a fertilizer injection tube, and a shoe 78. The opener attachment 70 further includes a depth adjustment assembly 80 configured to enable the gauge wheel 76 to be positioned in one of a number of gauge wheel positions to control the penetration depth of the opener disc 74 into the soil. For example, in the illustrated embodiment, the depth adjustment assembly 80 includes bolts and corresponding openings to secure the gauge wheel 76 at various positions along the vertical axis 6 relative to the opener attachment frame 72. However, it should be appreciated that in alternative embodiments, the depth adjustment assembly 80 may include another suitable system for adjusting the penetration depth of the opener disc 74.

As the row unit 16 travels across a field, the opener disc 74 excavates a trench 75 into the soil, and fertilizer is deposited into the trench 75. In certain embodiments, the opener disc 74 of the opener attachment 70 and the opener discs 38 of the opener assembly 32 are positioned such that the trenches 75 and 39 (excavated by the opener disc 74 and the opener discs 38, respectively) are both parallel to the direction of travel 30 but are offset from each other in one or more directions. For example, the trenches 75 and 39 may be offset from one another in the y-direction 4 by an offset distance of two inches, and in the z-direction 6 by another offset distance of two inches (e.g., generally referred to as a 2"×2" offset arrangement). However, in certain embodiments, the offset distance(s) in the x-direction 2, the y-direction 4, the z-direction 6, or a combination thereof, may be selected to accommodate the agricultural product being deposited into the soil, for example.

Figure 3:
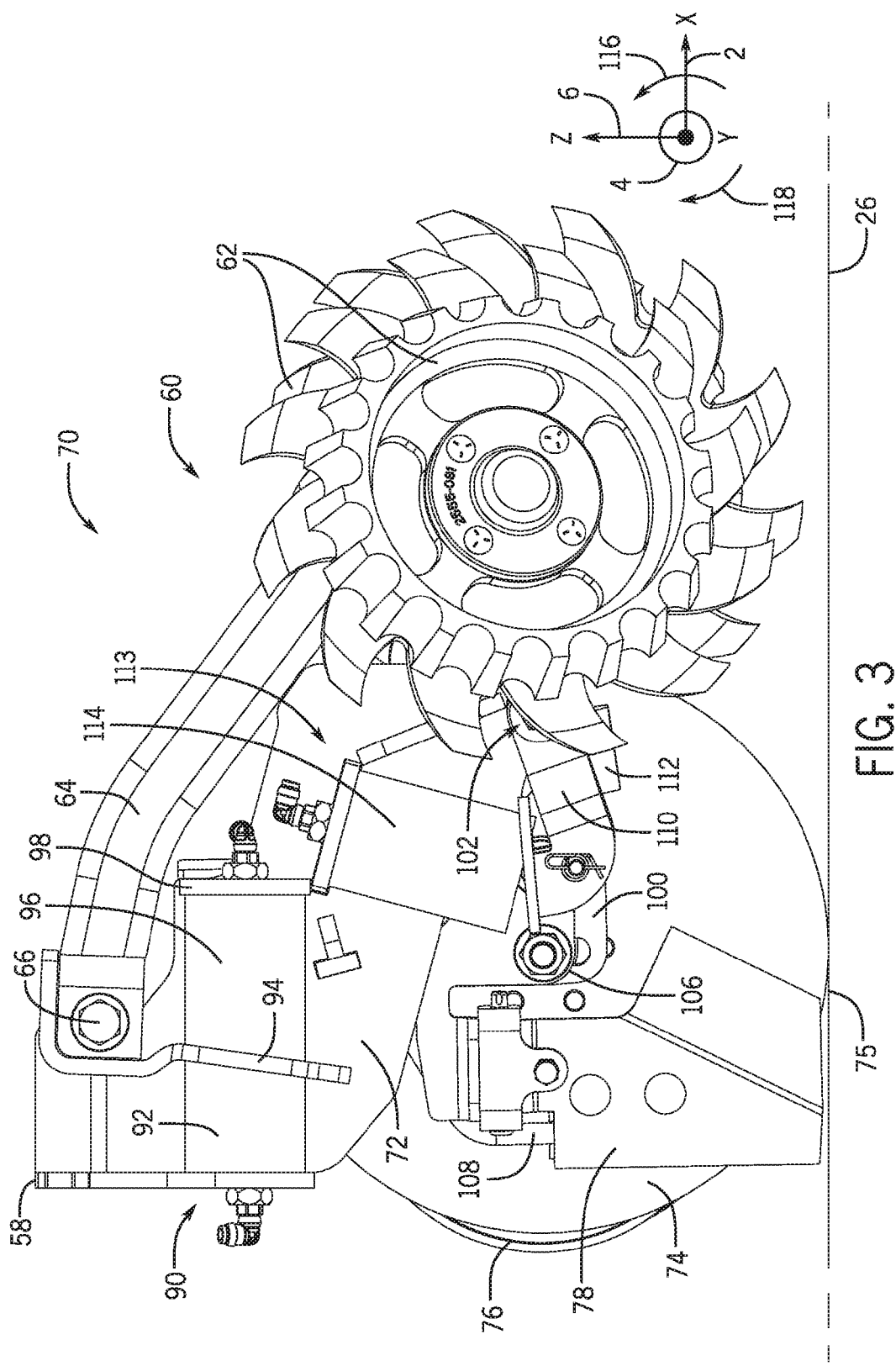
FIG. 3 is a side view of the opener attachment of FIG. 2.

FIG. 3 is a side view of the opener assembly 70 of FIG. 2. As previously discussed, the residue manager 60 includes the cleaner wheels 62 rotatably coupled to the arm 64, which is pivotally coupled to the opener attachment frame 72 at the joint 66. In the illustrated embodiment, the residue manager 60 includes a down pressure/lift system 90 coupled to the mounting assembly 58 and to the frame 72. The down pressure/lift system 90 is configured to urge the arm 64 downwardly, thereby driving the cleaner wheels 62 to engage the soil surface 26. For example, if the crop residue on the soil surface 26 and/or the soil itself is hard/dense, the down pressure/lift system 90 may urge the arm 64 downwardly with a greater force than if the crop residue/soil is less dense. In addition, the down pressure/lift system 90 is configured to raise the cleaner wheels 62 above the soil surface 26 (e.g., if no crop residue is present in the field).

In the illustrated embodiment, the down pressure/lift system 90 includes a first air bag 92 extending between the mounting assembly 58 and an extension 94 of the arm 64. In the illustrated embodiment, the extension 94 is rigidly coupled to the arm 64. In addition, the down pressure/lift system 90 includes a second air bag 96 extending between the extension 94 and a mount 98, which is coupled to the frame 72. Inflation of the first air bag 92 and/or deflation of the second air bag 92 drives the arm 64 upwardly or reduces the downward torque on the arm 64, thereby raising the cleaner wheels 62 about the soil surface 26 or reducing the contact force between the cleaner wheels 62 and the soil surface 26. In addition, inflation of the second air bag 96 and/or deflation of the first air bag 92 drives the arm 64 downwardly, thereby establishing/increasing the contact force between the cleaner wheels 62 and the soil surface 26. The pressure within each air bag may be controlled (e.g., via a controller and a valve assembly) to control the position of the cleaners wheels and/or the force applied by the cleaner wheels to the soil surface 26. Furthermore, if the cleaner wheels 62 encounter a rock or other obstruction in the field, the joint 66 and the down pressure/lift system 90 may enable the cleaner wheels 62 to move upwardly relative to the frame 72, thereby substantially isolating the frame 72 from the movement/load on the cleaner wheels 62.

Furthermore, the opener attachment 70 includes a first arm 100 that is pivotally coupled to the frame 72 about a shaft assembly 102. The opener disc 74 is rotatably coupled to the first arm 100 via a depth adjustment assembly 106. The depth adjustment assembly 106 includes a bolt that secures the opener disc 74 to the first arm 100 (e.g., along z-direction 6). In addition, an injection tube or fertilizer injection tube 108 and the shoe 78 are also coupled to the first arm 100 via the depth adjustment assembly 106, and the shoe 78 is configured to direct soil around the fertilizer injection tube. As the opener disc 74 excavates the trench 75 into the soil, fertilizer is deposited into the trench 75 via the fertilizer injection tube 108. In addition, the gauge wheel 76 is also coupled to the first arm 100 via the depth adjustment assembly 80 (FIG. 2), such that the gauge wheel 76 is next to or in contact with the opener disc 74 along the lateral axis 4. By adjusting the adjustment assemblies 80 and 106, the deposition depth of the fertilizer may be controlled. It may also be appreciated that while the opener disc 74 and the gauge wheel 76 are coupled next to each other, the gauge wheel 76 may block movement of the opener disc 74 into the soil, and may also control soil flow away from the opener disc 74, thereby managing the displaced soil.

Furthermore, in the illustrated embodiment, the opener attachment 70 also includes a second arm 110 pivotally coupled to the frame 72 about the shaft assembly 102. In addition, the second arm 110 is non-pivotally coupled to the first arm 100 such that rotation of the second arm 110 drives the first arm 100 to rotate, as will be discussed in more detail below. The first arm 100 and the second arm 110 are configured to rotate together about the shaft assembly 102 either in a counterclockwise direction or a first direction as indicated by an arrow 116, and in a clockwise direction or a second direction as indicated by an arrow 118. A mechanical stop 112 is rigidly coupled to the frame 72 and is configured to block rotation of the first arm 100, and consequently the second arm 110, in the first rotational direction 116 beyond a certain angle via contact with the first arm 100. In an alternative embodiment, the mechanical stop 112 may be configured to block rotation of the second arm 110 and the first arm 100 via contact with the second arm 110. The opener attachment 70 further includes an actuator system 113 (e.g., a pneumatic actuator, a hydraulic actuator, spring, etc.) configured to urge the first arm 100 and the second arm 110 to rotate in the first direction 116. In the illustrated embodiment, the actuator system 113 includes an air bag (e.g., biasing member) 114 that is coupled to the frame 72 and to the second arm 110. Furthermore, because the opener disc 74, the gauge wheel 76, the fertilizer injection tube 108, and the shoe 78 are coupled to the first arm 100, the opener disc 74, the gauge wheel 76, the fertilizer tube 108, and the shoe 78 are driven toward the soil surface 26 by the air bag 114. Accordingly, the air bag 114 may enable the opener attachment 70 to maintain the fertilizer deposition depth (e.g., by driving the first arm 100 into contact with the mechanical stop 112). In addition, the arms 100 and 110, the shaft assembly 102, and the air bag 114 may enable the opener disc 74, the gauge wheel 76, the fertilizer tube 108, and the shoe 78 to move upwardly in response to contact with an obstruction (e.g., rock) within the field, thereby substantially isolating the row unit frame from the movement/load associated with the contact. While the illustrated embodiment employs an air bag 114 to urge the opener disc 74, the gauge wheel 76, the fertilizer tube 108, and the shoe 78 downwardly, it should be appreciated that in alternative embodiments, the opener attachment 70 may include another suitable biasing member, such as a mechanical spring or rubber isolator, among others.

Figure 4:
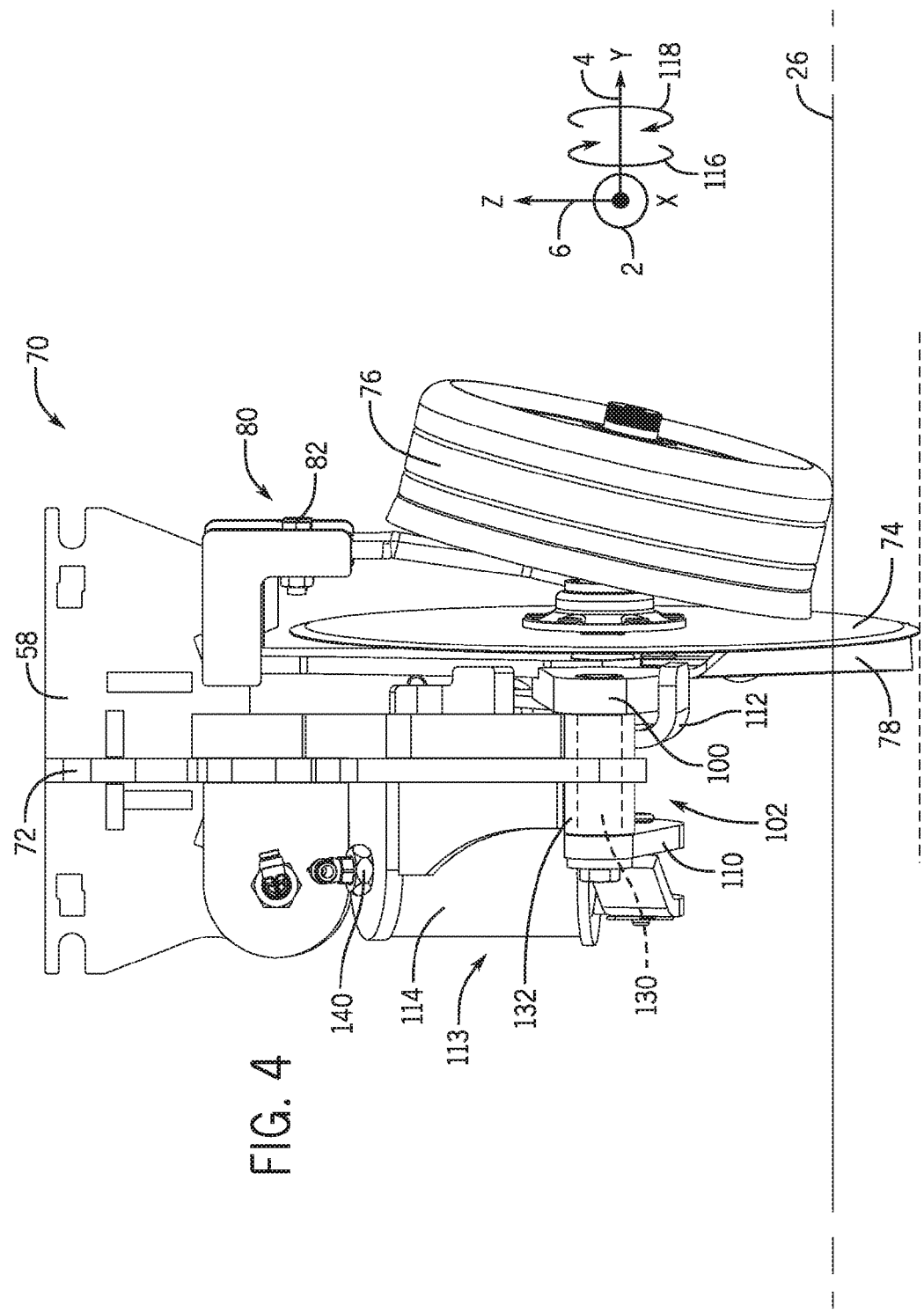
FIG. 4 is a front view of the opener attachment of FIG. 2.

FIG. 4 is a front view of the opener attachment 70 of FIG. 2. As illustrated, the first arm 100 and the second arm 110 non-pivotally coupled to one another and pivotally coupled to the frame 72 by the shaft assembly 102. As a result, the first arm 100 and the second arm 110 may rotate together relative to the frame 72. In the illustrated embodiment, the shaft assembly 102 includes an inner shaft 130 and a hollow outer casing 132 circumferentially disposed about the inner shaft 130. The frame 72 is rigidly and non-rotatably coupled to the outer casing 132 of the shaft assembly 102 at a middle point (e.g., half way along the total length of the shaft in the axial direction). The second arm 110 is rigidly and non-rotatably coupled to the inner shaft 130 of the shaft assembly 102 such that the second arm 110 does not rotate relative to the inner shaft 130. And, the first arm 100 is rigidly and non-rotatably coupled to the inner shaft 130 of the shaft assembly 102 such that the first arm 100 does not rotate relative to the inner shaft 130. The inner shaft 130 is configured to rotate relative to the outer casing 132. Because both the first arm 100 and the second arm 110 are rigidly and non-rotatably coupled to the inner shaft 130 (e.g., with no rotational freedom relative to the inner shaft), the first arm 100 and the second arm 110 rotate together relative to the frame 72.

Figure 5:
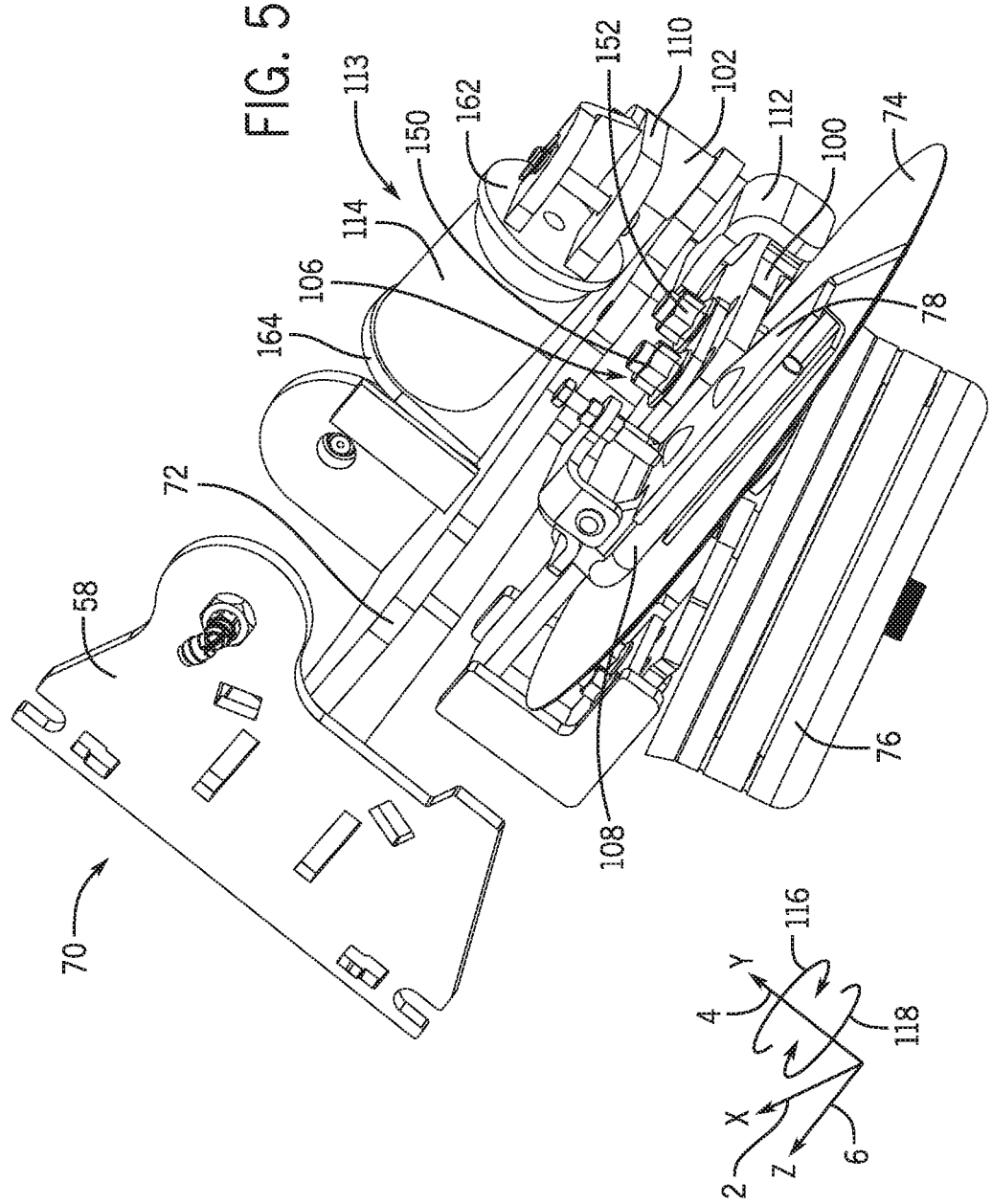
FIG. 5 is a perspective view of the opener attachment of FIG. 2.

FIG. 5 is a perspective view of the opener attachment 70 of FIG. 2. As set forth above, the opener disc 74, the gauge wheel 76, fertilizer tube 108, and the shoe 78 are coupled to the first arm 100 via the depth adjustment assembly 106. In the illustrated embodiment, the depth adjustment assembly 106 includes two bolt assemblies 150 and 152, each including a bolt and a nut. The fertilizer injection tube 108 and the shoe 78 are secured to the first arm 100 by the bolt assemblies 150 and 152 at one of a number of positions along the vertical axis 6 to enable the positions of the fertilizer injection tube 108 and the shoe 78 to be adjusted relative to the first arm 100.

The opener disc 74 is rotatably coupled to the first arm 100 via a shaft, which is secured by the bolt assembly 150. In certain embodiments, one or more washers may be disposed along the shaft between the opener disc 74 and the first arm 100 to facilitate adjustment of the position of the opener disc 74 in the y-direction 4 relative to the first arm 100. As such, by adjusting the total number and/or thickness of the washer(s), the fertilizer trench may be formed in various positions along the lateral axis 4 relative to the seed trench.

Figure 6:
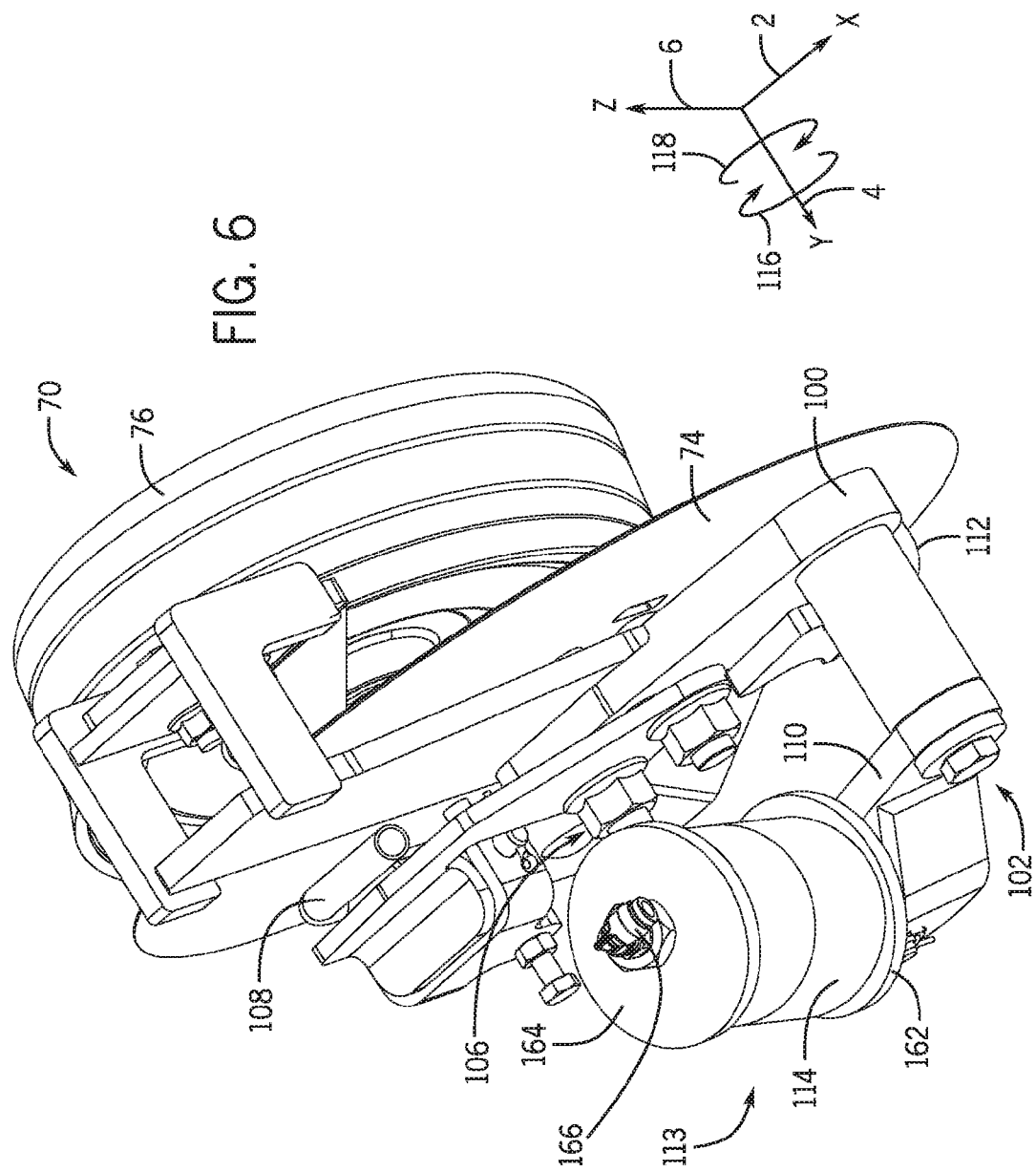
FIG. 6 is another perspective view of the opener attachment of FIG. 2.

FIG. 6 is another perspective view of the opener attachment 70 of FIG. 2. As set forth above, the opener attachment 70 includes the actuator system 113 that includes the air bag 114 configured to urge the second arm 110 to rotate downwardly, which in turn, drives downward rotation of the first arm 100, thereby driving the gauge wheel 76, the opener disc 74, the fertilizer injection tube 108, and the shoe 78 toward the soil surface 26. One end of the air bag 114 is coupled to a plate 162, which in turn, is rigidly coupled to the second arm 110, while the other end of the air bag 114 is rigidly coupled to the frame 72 via a plate 164. Furthermore, in the illustrated embodiment, the air bag 114 (e.g., air spring, air shock absorber, etc.) is configured to receive pressurized air via a fitting 166. A pressure of the air may be controlled as to vary an internal pressure inside the air bag 114. The variations in the internal pressure, in turn, control the force applied to the second arm 110. For example, a relatively high internal pressure inside the air bag 114 may drive the plate 162 in a downward direction toward the soil surface 26 (e.g., opposite to the z-direction 6), which in turn induces the second arm 110 to rotate in the first rotational direction 116. Because the second arm 110 is non-pivotally coupled to the first arm 100, rotation of the second arm 110 also drives the first arm 100 to rotate, thereby driving the gauge wheel 76, the opener disc 74, the fertilizer injection tube 108, and the shoe 78 toward the soil surface 26. For example, a high internal pressure (e.g., significantly higher than an atmospheric pressure) causes inflation of the air bag 114, which in turn, drives the second arm 110 downwardly with a first force. In addition, a medium internal pressure (e.g., higher than the atmospheric pressure, but lower than the high internal pressure) drives the second arm 110 downwardly with a second force, less than the first force. In certain embodiments (e.g., in embodiments in which the air bag is double-acting), a low internal pressure (e.g., lower than the atmospheric pressure) causes deflation of the air bag 114, which in turn, drives the second arm 110 upwardly, thereby moving the gauge wheel 76, the opener disc 74, the fertilizer injection tube 108, and the shoe 78 above the soil surface 26. In the illustrated embodiment, the air bag 114 is configured to urge the second arm 110 to rotate, thereby urging the first arm 100 to rotate. As the first arm 100 rotates in the first rotational direction 116, the first arm 100 pivots about the shaft assembly 102 in a generally downward direction, which drives the opener disc 74, the gauge wheel 76, the fertilizer injection tube 108, and the shoe 78 in a downward direction toward the soil surface 26. As such, rotation of the second arm 110 and consequently the first arm 100 in the first rotational direction 116 urges the gauge wheel 76, the opener disc 74, the fertilizer injection tube 108, and the shoe to engage the soil.

In certain embodiments, the air bag 114 may be double-acting and configured to lift the opener disc 74, the gauge wheel 76, the fertilizer injection tube 108, and the shoe 78 above the soil surface 26. For example, reducing the internal pressure within the air bag 114 (e.g., to less than the atmospheric pressure) may induce the air bag 114 to drive the second arm 110 to rotate in the second rotational direction 118, thereby driving the first arm 100 to rotate in the second rotational direction 118. As the first arm 100 rotates in the second rotational direction 118, the first arm 100 pivots about the shaft assembly 102 in a generally upward direction, which lifts the opener disc 74, the gauge wheel 76, the fertilizer injection tube 108, and the shoe 78 in an upward direction away from the soil surface 26. As such, rotation of the second arm 110, and consequently the first arm 100, in the second rotational direction 118 lifts the gauge wheel 76, the opener disc 74, the fertilizer injection tube 108, and the shoe 78 to disengage the soil. In alternative embodiments, a second air bag may be used for lifting the gauge wheel 76, the opener disc 74, the fertilizer injection tube 108, and the shoe 78. In such embodiments, increasing the internal pressure within the second air bag may drive rotation of the first and second arms, thereby lifting the gauge wheel 76, the opener disc 74, the fertilizer injection tube 108, and the shoe 78. As may be appreciated, by varying the pressure exerted by the air bag 114, the contacting force of the opener disc 74 and the gauge wheel 76 against the soil may be controlled. For example, if the soil is hard/dense, the air bag 114 may be configured to exert a larger pressure to urge the opener disc 74 and the gauge wheel 76 toward the soil surface 26 with a greater force.

Furthermore, as the first arm 100 rotates in the first rotational direction 116 and pivots about the shaft assembly 102 in a generally downward direction, the mechanical stop 112 blocks the downward movement of the first arm 100 beyond a certain depth angle relative to the frame 72. Because the opener disc 74, the gauge wheel 76, the fertilizer injection tube 108, and the shoe 78 are coupled to the first arm 100, the downward movement of the abovementioned elements is also blocked by the mechanical stop 112. As such, the mechanical stop 112 may control the position of the opener disc 74, the gauge wheel 76, the fertilizer injection tube 108, and the shoe 78 relative to the frame 72. In the illustrated embodiment, the air bag 114 is also configured to absorb energy and isolate vibrations associated with contact between the gauge wheel 76, the opener disc 74, the fertilizer injection tube 108, the shoe 78, or a combination thereof, with an obstruction (e.g., rock) in the field. For example, when the opener disc 74 encounters an obstruction in the field, such as rocks, the opener disc 74, the first arm 100, and the second arm 110 may move upwardly against the force of the air bag 114. As a result, the air bag 114 may compress, thereby absorbing at least a portion of the energy associated with the deflection of the opener disc 74, the gauge wheel 76, the fertilizer injection tube 108, the shoe 78, or a combination thereof. While the illustrated embodiment includes an air bag 114, it should be appreciate that in alternative embodiments, the opener attachment 70 may include any other suitable biasing member (e.g., more than one air bags, one or more springs, one or more resilient dumpers, such as resilient tubes, one or more pneumatic cylinders, one or more hydraulic cylinders, or a combination thereof, among others).

Figure 7:
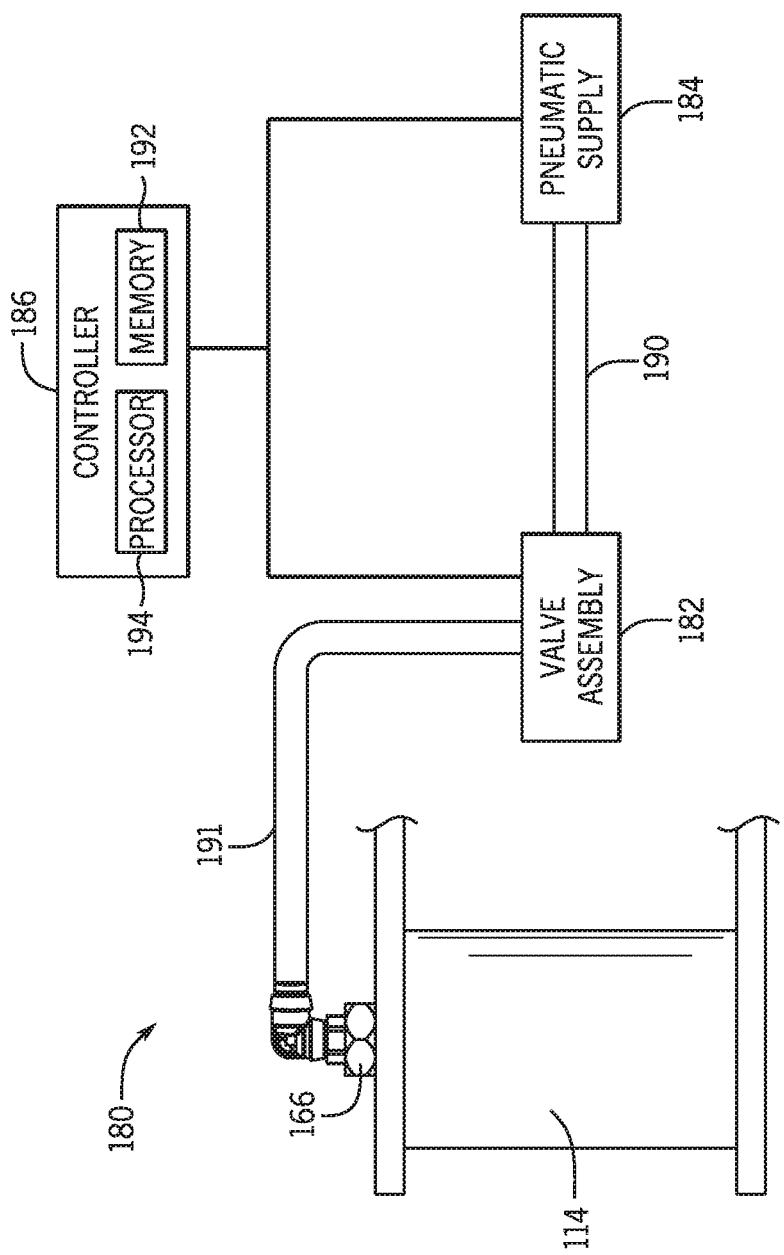
FIG. 7 is a schematic diagram of an embodiment of a pneumatic system configured to control a force exerted by a biasing member of the opener attachment.

FIG. 7 is a schematic diagram of an embodiment of a pneumatic system 180 that may be used to control a force applied by the air bag 114 of the opener attachment 70. The pneumatic system 180 may be configured to control a pressure within the air bag 114, thereby controlling a force exerted by the air bag 114. The pneumatic system 180 includes a valve assembly 182, a pneumatic supply 184, and a controller 186. The pneumatic supply 184 supplies pressurized air to the valve assembly 182 via air conduits 190. The valve assembly 182 includes at least one valve (e.g., solenoid valve, needle valve, orifice valve, or any other suitable valve) that is pneumatically coupled to the air bag 114 configured to control or regulate the airflow from the pneumatic supply 184 to the air bag 114. In certain embodiments, the down pressure/lift system 90 of the residue manager 60 may be configured to receive pressurized air from the same pneumatic supply 184 and/or to be controlled by the same valve assembly 182 and/or controller 186 as the air bag 114.

For example, the controller 186 may receive instructions to control the force applied by the air bag 114. Accordingly, the controller 186 may control the pneumatic supply 184 and/or the valve assembly 182 to achieve the desired force. The controller 186 includes a memory 192 (e.g., a non-transitory computer-readable medium/memory circuitry) storing one or more sets of instructions (e.g., processor-executable instructions) implemented to operate the pneumatic supply 184 and/or the valve assembly 182. The controller 186 also includes one or more processors 194 configured to access and execute the one or more sets of instructions encoded by the memory 192, e.g., to control the valve assembly 182 and/or the pneumatic supply 184. For example, the memory 192 may include volatile memory, such as random access memory (RAM), and/or non-volatile memory, such as read-only memory (ROM), optical drives, hard disc drives, or solid-state drives. Additionally, the one or more processors 194 may include one or more application specific integrated circuits (ASICs), one or more field programmable gate arrays (FPGAs), one or more general purpose processors, or any combination thereof. Furthermore, the term processor is not limited to just those integrated circuits referred to in the art as processors, but broadly refers to computers, processors, microcontrollers, microcomputers, programmable logic controllers, application specific integrated circuits, and other programmable circuits.

By way of example, the pneumatic supply 184 may receive a signal from the controller 186 indicative of instructions to supply pressurized air (e.g., higher than the atmospheric pressure) to the valve assembly 182 via air conduit 190. In addition, the valve assembly 182 may receive a signal from the controller 186 indicative of instructions to maintain the respective valve(s) at an open position to supply pressurized air to the air bag 114 via the air conduit 191 and the fitting 166. As the air bag 114 is filled with the pressurized air, an internal pressure inside the air bag 114 increases, and in turn, the air bag 114 urges the opener disc 74, the gauge wheel 76, the fertilizer injection tube 108, and the shoe 78 downwardly toward the soil. Once a desired amount of air has been supplied to the air bag 114 (e.g., based on a manually or automatically determined down force for the opener disc 74, the gauge wheel 76, the fertilizer injection tube 108, and the shoe 78), the controller 186 may send a signal to the pneumatic supply 184 indicative of instructions to stop supplying the pressurized air, and/or may send a signal to the valve assembly 182 indicative of instructions to close the respective valve(s) to maintain the internal pressure inside the air bag 114. In addition, the controller 186 may send a signal to the pneumatic supply 184 indicative of instructions to remove air from the air bag 114, such that the internal pressure within the air bag is reduced below the atmospheric pressure. As a result, the air bag 114 may compress, thereby lifting the opener disc 74, the gauge wheel 76, the fertilizer injection tube 108, and the shoe 78 above the soil surface 26. In certain embodiments, the pneumatic system 180 includes a second air bag pneumatically coupled to the valve assembly 182 and configured to drive the opener disc 74, the gauge wheel 76, the fertilizer injection tube 108, and the shoe 78 upwardly relative to the soil surface (e.g., via coupling between the second air bag and the first arm 100 or the second arm 110). In such embodiments, the controller 186 may output signals to the pneumatic supply 184 and to the valve assembly 182 indicative of instructions to supply pressurized air to the second air bag, thereby causing the internal pressure within the second air bag to increase. Expansion of the second air bag drives the opener disc 74, the gauge wheel 76, the fertilizer injection tube 108, and the shoe 78 upwardly relative to the soil surface. In certain embodiments, the controller 186 may be configured to output signals to the pneumatic supply 184 and/or to the valve assembly 182 indicative of instructions to control the pressurized air flow to the down pressure/lift system 90 of the residue manager 60.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An opener attachment for an agricultural row unit, comprising:
   a frame;
   a first arm pivotally coupled to the frame;
   an opener disc coupled to the first arm and configured to excavate a trench into soil;
   a gauge wheel coupled to the first arm and configured to block movement of the opener disc into the soil to control a depth of the trench;
   a second arm pivotally coupled to the frame and non-pivotally coupled to the first arm such that rotation of the second arm drives the first arm to rotate;

a mechanical stop coupled to the frame, wherein the mechanical stop is configured to block rotation of the first and second arms relative to the frame in a first rotational direction, wherein rotation of the first arm in the first rotational direction moves the gauge wheel and the opener disc toward the soil; and a biasing member coupled to the frame and to the second arm, wherein the biasing member is configured to drive the second arm in the first rotational direction.

2. The opener attachment of claim 1, wherein the biasing member comprises an air bag.

3. The opener attachment of claim 2, wherein the air bag is configured to drive the first arm and the second arm to rotate in a second rotational direction, opposite the first rotation direction, to drive the opener disc and the gauge wheel upwardly relative to the frame.

4. The opener attachment of claim 1, comprising a mount coupled to the frame and configured to secure the frame to the agricultural row unit.

5. The opener attachment of claim 1, comprising an injection tube coupled to the first arm, wherein the injection tube is configured to deposit agricultural product into the trench.

6. The opener attachment of claim 5, comprising a shoe coupled to the first arm and configured to direct soil around the injection tube.

7. The opener attachment of claim 1, wherein the first arm is non-pivotally coupled to the second arm by an inner shaft of a shaft assembly, the frame is rigidly coupled to an outer casing of the shaft assembly, the outer casing is circumferentially disposed about the inner shaft, and the inner shaft is configured to rotate within the outer casing.

8. The opener attachment of claim 1, comprising a residue manager, wherein the residue manager comprises a third arm and at least one cleaner wheel rotatably coupled to the third arm, the third arm is pivotally coupled to the frame, and the residue manager comprise a down pressure/lift system coupled to the third arm and configured to urge the at least one cleaner wheel into engagement with the soil.

9. The opener attachment of claim 8, wherein the down pressure/lift system comprises opposing air bags positioned on opposite sides of an extension rigidly coupled to the third arm.

10. An opener attachment for an agricultural row unit, comprising:
a frame;
a first arm pivotally coupled to the frame;
an opener disc coupled to the first arm and configured to excavate a trench into soil;
a gauge wheel coupled to the first arm and configured to block movement of the opener disc into the soil to control a depth of the trench;
a mechanical stop coupled to the frame, wherein the mechanical stop is configured to block rotation of the first arm relative to the frame in a first rotational direction, wherein rotation of the first arm in the first rotational direction moves the gauge wheel and the opener disc toward the soil; and
an actuator system configured to drive the first arm in the first rotational direction and in a second rotational direction, opposite the first rotational direction, wherein rotation of the first arm in the second rotational direction lifts the gauge wheel and the opener disc away from the soil.

11. The opener attachment of claim 10, wherein the actuator system comprises an air bag directly or indirectly coupled to the first arm.

12. The opener attachment of claim 11, wherein the actuator system comprises a valve assembly pneumatically coupled to the air bag, and a pneumatic supply pneumatically coupled to the valve assembly.

13. The opener attachment of claim 12, wherein the actuator system comprises an electronic controller communicatively coupled to the pneumatic supply, to the valve assembly, or a combination thereof, wherein the electronic controller is configured to output signals to the pneumatic supply, to the valve assembly, or the combination thereof, to control an internal pressure within the air bag.

14. The opener attachment of claim 11, comprising a second arm, wherein the air bag is directly coupled to the second arm, the first arm is non-pivotally coupled to the second arm by an inner shaft of a shaft assembly, the frame is rigidly coupled to an outer casing of the shaft assembly, the outer casing is circumferentially disposed about the inner shaft, and the inner shaft is configured to rotate within the outer casing.

15. The opener attachment of claim 10, wherein the opener disc is configured to be coupled to the first arm at one of a plurality of vertical positions.

16. The opener attachment of claim 10, comprising an injection tube coupled to the first arm, wherein the injection tube is configured to deposit agricultural product into the trench.

17. An opener attachment for an agricultural row unit, comprising:
a frame;
a first arm pivotally coupled to the frame;
an opener disc coupled to the first arm and configured to excavate a trench into soil;
a gauge wheel configured to block movement of the opener disc into the soil to control a depth of the trench, wherein the gauge wheel is rotatably coupled to the first arm via a bolt, and the first arm comprises a plurality of openings configured to receive the bolt to secure the gauge wheel to the first arm at a plurality of vertical positions relative to the first arm;
a second arm pivotally coupled to the frame and non-pivotally coupled to the first arm such that rotation of the second arm drives the first arm to rotate;
a mechanical stop coupled to the frame, wherein the mechanical stop is configured to block rotation of the first and second arms relative to the frame in a first rotational direction, wherein rotation of the first arm in the first rotational direction moves the gauge wheel and the opener disc toward the soil; and
a biasing member coupled to the frame and to the second arm, wherein the biasing member is configured to drive the second arm in the first rotational direction.

18. The opener attachment of claim 17, wherein the biasing member comprises an air bag.

19. The opener attachment of claim 18, wherein the air bag is configured to drive the first arm and the second arm to rotate in a second rotational direction, opposite the first rotation direction, to drive the opener disc and the gauge wheel upwardly relative to the frame.

20. The opener attachment of claim 17, wherein the first arm is non-pivotally coupled to the second arm by an inner shaft of a shaft assembly, the frame is rigidly coupled to an outer casing of the shaft assembly, the outer casing is circumferentially disposed about the inner shaft, and the inner shaft is configured to rotate within the outer casing.

* * * * *